(12) United States Patent
Imamura

(10) Patent No.: US 6,725,355 B1
(45) Date of Patent: Apr. 20, 2004

(54) ARITHMETIC PROCESSING ARCHITECTURE HAVING A PORTION OF GENERAL-PURPOSE REGISTERS DIRECTLY COUPLED TO A PLURALITY OF MEMORY BANKS

(75) Inventor: Yoshihiko Imamura, Ibaraki (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/132,413

(22) Filed: Aug. 11, 1998

(30) Foreign Application Priority Data

Aug. 11, 1997 (JP) .......................................... P9-216827

(51) Int. Cl.⁷ ................................................ G06F 9/00
(52) U.S. Cl. .............................. 712/36; 712/32; 712/35; 712/23
(58) Field of Search ................................. 712/214, 215, 712/225, 221, 25, 32–36, 41; 708/100, 200

(56) References Cited

U.S. PATENT DOCUMENTS

| 4,777,587 A | * | 10/1988 | Case et al. .................. 712/235 |
| 4,964,046 A | * | 10/1990 | Mehrgardt et al. ............. 712/36 |
| 5,187,799 A | * | 2/1993 | McAuley et al. .............. 712/36 |
| 5,303,354 A | * | 4/1994 | Higuchi et al. .............. 712/218 |
| 5,404,552 A | * | 4/1995 | Ikenaga ...................... 712/41 |
| 5,619,720 A | * | 4/1997 | Garde et al. .................. 712/38 |
| 5,685,005 A | * | 11/1997 | Garde et al. .................. 712/36 |
| 5,692,207 A | * | 11/1997 | Ho-Lung et al. ............. 712/36 |
| 5,854,939 A | * | 12/1998 | Wollan et al. ................. 712/41 |
| 5,892,965 A | * | 4/1999 | Miura et al. .................. 712/34 |
| 6,029,242 A | * | 2/2000 | Sidman ....................... 712/42 |
| 6,425,070 B1 | * | 7/2002 | Zou et al. ..................... 712/35 |

* cited by examiner

*Primary Examiner*—Wen Tai Lin
(74) *Attorney, Agent, or Firm*—Rader, Fishman & Grauer PLLC; Ronald P. Kananen

(57) ABSTRACT

A microprocessor having an internal memory for storing data to be process, a data pointer register for storing an address on the internal memory, a decoder 36 for decoding an instruction, a general-purpose register module 11 including data registers r0 and r1 for storing data read from an address on the internal memory stored in the data pointer register in accordance with a request to read data stored in the internal memory, and an ALU 13 for performing processing using data stored in the general-purpose register module 11 based on the result of decoding by the decoder 36 and writing the result of processing in the general-purpose register module 11.

27 Claims, 16 Drawing Sheets

FIG. 6

OP   [SOURCE REGISTER], [DESTINATION REGISTER]

FIG. 7 add      r0, r4  ;  r0 + r4 → r4

FIG. 8 add      r5, r1  ;  r5 + r1 → r1

FIG. 9 add      r0, r1  ;  r0 + r1 → r1

FIG. 11

DP  [SOURCE REGISTER], [SOURCE REGISTER], [DESTINATION REGISTER]

FIG. 12

```
mov    r0,  r2,        ;    r0→r2 add    r2,  r9,  r3    ;    r2+r9→r3
mov    r3,  r1,        ;    r3→r1
```

FIG. 13

```
add    r0,  r9,  r1    ;    r0+r9→r1
```

FIG. 14

| | | | | |
|---|---|---|---|---|
| add | r0 , r9 , r1 | ; | r1 ← r0 + r9 |
| add | r0 , r9 , r1 | ; | r1 ← r0 + r9 |
| add | r0 , r9 , r1 | ; | r1 ← r0 + r9 |
| add | r0 , r9 , r1 | ; | r1 ← r0 + r9 |
| add | r0 , r9 , r1 | ; | r1 ← r0 + r9 |
| add | r0 , r9 , r1 | ; | r1 ← r0 + r9 |
| add | r0 , r9 , r1 | ; | r1 ← r0 + r9 |
| add | r0 , r9 , r1 | ; | r1 ← r0 + r9 |

FIG. 15

| | | | | |
|---|---|---|---|---|
| add | r0 , r14 , r1 | ; | r1 ← r0 + r14 |
| add | r0 , r14 , r1 | ; | r1 ← r0 + r14 |
| add | r0 , r14 , r1 | ; | r1 ← r0 + r14 |
| add | r0 , r14 , r1 | ; | r1 ← r0 + r14 |
| add | r0 , r14 , r1 | ; | r1 ← r0 + r14 |
| add | r0 , r14 , r1 | ; | r1 ← r0 + r14 |
| add | r0 , r14 , r1 | ; | r1 ← r0 + r14 |
| add | r0 , r14 , r1 | ; | r1 ← r0 + r14 |

FIG. 17 add   r5,   r1

FIG. 18 add r0, r1   ;   CODE $C_1$
add r0, r1   ;   CODE $C_2$
add r0, r1   ;   CODE $C_3$
add r0, r1   ;   CODE $C_4$
add r0, r1   ;   CODE $C_5$
add r0, r1   ;   CODE $C_6$

FIG. 19A

CLOCK CYCLE →

|  | T | T+1 | T+2 | T+3 | T+4 | T+5 | T+6 | T+7 | T+8 |
|---|---|---|---|---|---|---|---|---|---|
| CODE C1 | IF | DEC | ALU | WB | | | | | |
| CODE C2 | | IF | DEC | ALU | WB | | | | |
| CODE C3 | | | IF | DEC | ALU | WB | | | |
| CODE C4 | | | | IF | DEC | ALU | WB | | |
| CODE C5 | | | | | IF | DEC | ALU | WB | |
| CODE C6 | | | | | | IF | DEC | ALU | WB |

FIG. 19B

| | load withr0 forC1 | load withr0 forC2 | load withr0 forC3 | load withr0 forC4 | load withr0 forC5 | load withr0 forC6 | | |

FIG. 19C

| | load withr1 forC1 | load withr1 forC2 | load withr1 forC3 | load withr1 forC4 | load withr1 forC5 | load withr1 forC6 | | |

FIG. 19D

| | | | store r1 for C1 | store r1 for C2 | store r1 for C3 | store r1 for C4 | store r1 for C5 | store r1 for C6 |

FIG. 21 add r2, r3, r4 ; r2←r3+r4

FIG. 22 lw r3, 0(r10) ; r3←[r10+0]
add r2, r3, r4 ; r2←r3+r4

FIG. 24

```
lw     r2,  0(r10)   ; r2←[r10+0]
                     :
addu   r3,  r2,  r9, ; r3←r2+r9
sw     r3,  0(r11)   ; r3→[r11+0]
```

FIG. 25

```
lw     r2,  0(r10)   ; r2←[r10+0]
                     :
addi   r10, 4        ; r10←r10+4
addu   r3,  r2,  r9, ; r3←r2+r9
sw     r3,  0(r11)   ; r3→[r11+0]
                     :
addi   r11, 4        ; r11←r11+4
```

ARITHMETIC PROCESSING ARCHITECTURE HAVING A PORTION OF GENERAL-PURPOSE REGISTERS DIRECTLY COUPLED TO A PLURALITY OF MEMORY BANKS

BACKGROUND OF THE INVENTION

1. Field of the Invention

The present invention relates to a microprocessor and a method thereof.

2. Description of the Related Art

When classifying microprocessors by general design concepts, they can be divided into, for example, a reduced instruction set computer (RISC) type and a complex instruction set computer (CISC) type.

Note that the program execution time, which decides the performance of the microprocessor per se, can be expressed by the following formula (1):

[Formula 1]

Program execution time=number of executed instructions (IC)×average number of clock cycles required per instruction (CPI)×clock cycle time (CCT)(1)

An RISC type microprocessor is based on the design concept of making the CPI in the above formula (1) close to 1 as much as possible by using instruction pipeline processing.

Therefore, in an RISC type microprocessor, instructions are made a fixed single length and a register-register format (load/store type architecture: only source operand for processing instruction is register operand) is used as an instruction format from the viewpoint of simplifying the functions of instructions functions to be suitable for instruction pipeline processing.

Also, an RISC type microprocessor performs static code scheduling by a compiler so as to prevent delays in the instruction pipeline processing.

On the other hand, a CISC type microprocessor is based on the design concept of improving the level of functions of instructions so as to eliminate the IC of the above formula (1).

Accordingly, in a CISC type microprocessor, instructions are made a plurality of fixed lengths or variable lengths, and the instruction format includes a mixture of the register-memory format and memory-memory format (where a memory operand is also possible for a source operand of a processing instruction). Namely, it direct processing between a register and memory is made possible.

When data on a memory is processed by an arithmetic and logic unit (ALU), an RISC type microprocessor requires at least two instructions, a load instruction and a store instruction, for accessing the memory.

On the other hand, a CISC type microprocessor does not require any instruction only for accessing the memory.

In a CISC type memory-processor, a large bit field is required in an instruction for designating a memory address. As mentioned above, a variable length instruction is used in many cases.

However, the decoding circuit tends to become complicated and large in size when using variable length instructions. Therefore, in a CISC type microprocessor, a the program execution time is being shortened by using super scalar technique or out-of-order technique to speed up the processing of data in the memory at the present time.

Below, an explanation will be given of the method of accessing a memory in a conventional RISC type and the CISC type microprocessor.

FIG. 20 is a view for explaining general-purpose registers in conventional RISC type and the CISC type microprocessors.

As shown in FIG. 20, a conventional microprocessor is provided with, for example, 16 general-purpose registers. Assume that these 16 general-purpose registers are referred to as r0 to r15.

When these registers are mounted in a processor architecture comprised of a set of 3-operand processing instructions, three ports in total, that is, two read ports and one write port, are necessary With a 3-operand processing instruction, as shown in FIG. 21, it is possible to designate three register designators of an ALU processing instruction.

Note that, in FIG. 21, a comment on the instruction written on the left side of the semicolon is given on the right side of the semicolon.

The instruction shown in FIG. 21 is an instruction to execute "r2-r3+r4". The registers r0 to r15 are general-purpose ones and are used for temporarily holding values.

In a processor using a load/store type architecture, a load/store instruction is executed for a general-purpose register in order to realize a load/store operation on a memory. There are no instructions which are directly entered into the ALU processor. This is often seen in RISC type processors.

As shown in FIG. 22, when processing data in the memory, it is necessary to execute a load instruction "1w r3, 0 (r10)" once.

On the other hand, in some CISC processors, it is possible to designate data on a memory as an operand of an ALU processing instruction. In this case, however, a general-purpose register is not used. A memory buffer is used directly.

Below, an explanation will be given of pipeline processing in a conventional RISC type processor.

In an RISC type processor, a five-stage or eight-stage pipeline structure is often used.

For example, the "R3000" (product name) of the MIPS Co., as shown in FIG. 23, uses a five-stage pipeline comprising an instruction fetch (IF) stage, an instruction decode (DEC) stage, a memory (MEM) stage, and a write back (WB) stage.

This processor fetches (reads) an instruction in the first IF stage and decodes the instruction in the second DEC stage. Note that if the instruction designates a general-purpose register as a source register, the processor decodes the instruction in the DEC stage, then reads the data from the general-purpose register.

Next, at the third ALU stage, it executes an ALU processing instruction. Note that when the fetched instruction is not an ALU instruction, nothing is done in the ALU stage and the data is output to the ALU output port as it is.

Next, in the fourth MEM stage, when the fetched instruction is a memory access instruction, the processor outputs a memory address used for memory access to a memory unit for accessing the memory.

Next, fifth, for an instruction which designates a general-purpose register as a destination register, the processor writes back the result of the ALU processing in the general-purpose register. If the instruction is a memory read instruction (load instruction), it receives a value from the memory unit and writes it in the general-purpose register.

As shown in FIG. 23, a processor using a five-stage pipeline performs, for example, in a clock cycle X, the WB stage of a code C1, the MEM stage of a code C2, the ALU stage of a code C3, the DEC stage of ta code C4, and the IF stage of a code C5 by multiplexing.

However, as explained above, since an RISC type processor uses a load/store type instruction set architecture, the ALU processing instructions and the load/store instructions exist separately and independently of each other.

Accordingly, in order to multiplex the desired instruction with these instructions, for example, use of the five-stage pipeline structure shown in FIG. 23 is convenient. Namely, the memory access instruction and other instructions can be executed simultaneously. Since it is assumed that there is only one system (1 set) of paths for memory access, it is impossible to execute memory read and memory write operations at the same MEM stage simultaneously.

Also, when treating a memory access instruction and the other instructions as independent, unused pipeline stages end up occurring. For example, in a transfer instruction between registers, the function of the MEM stage is not used. Also, in a memory access instruction, the function of the ALU stage is not used. Note that the address generating processing for memory access is performed in units other than the ALU.

In the five-stage pipeline processing shown in FIG. 23, when data on the memory is processed by the ALU, the program is written, for example, as shown in FIG. 24

In the program shown in FIG. 24, first, the processor loads the data at the memory address indicated by the register r10 to the register r2 by the instruction "1w r2, 0 (r10 )". Next, it adds the values in the registers r2 and r9 and inserts the result in the register r3 by the instruction "addu r3, r2, r9". Next, it stores (writes back) the value in the register r3 in the memory address indicated by the register r11 by the instruction "sw r3, 0 (r11)". These operations are written by three instructions. Since each instruction requires at least one clock cycle for execution, three cycles are required to execute the three instructions. In actuality, one more cycle is required because the data read (loaded) from the memory cannot be referred to by the immediately succeeding instruction.

However, in video processing, audio processing, and other media processing, it is necessary to repeatedly perform a predetermined ALU processing on data in the space of consecutive memory addresses. In this case, as shown in FIG. 25, the instructions "addi r10 , 4" and the instruction "addi r11, 4" for updating the memory address must be further added to the program shown in FIG. 24. As a result, there is the problem that at least five clock cycles are needed to execute the program shown in FIG. 25 and the processing time becomes longer.

Note that, in FIG. 25, the starting address of the source data of the addition processing on the memory is set using the register r10, while the starting address of the destination data is designated is set using the register r11.

Further, in the above-mentioned conventional five-stage pipeline processing in a microprocessor, since the memory access is executed at the MEM stage and there is only one system of paths for memory access provided, it is not possible to simultaneously execute a memory read operation and memory write operation. Therefore, it is necessary to write a program which writes a memory read instruction and memory write instruction independently. This has been an obstacle when trying to shorten the processing time.

SUMMARY OF THE INVENTION

An object of the present invention is to provide a microprocessor which is improved in its processing capability, and a method for the same, which can effectively perform processing accompanied with a predetermined pattern of consecutive accesses to a memory address space.

According to the first aspect of the present invention, there is provided a microprocessor, comprising: an internal memory for storing data to be processed; a data pointer register for storing an address on said internal memory and automatically updating a stored address in accordance with a predetermined pattern when there is a predetermined pattern in access to said internal memory; a decoding means for decoding instructions; a plurality of general-purpose registers including a data register for storing data read from an address on said internal memory stored in said data pointer register in accordance with a request for reading out data stored in said internal memory and for writing stored data at an address on said internal memory stored in said data pointer register in accordance with a request for writing data to said internal memory; and a processing means for performing processing by using data stored in said general-purpose registers and for writing the result of processing in said general-purpose registers in accordance with the result of decoding of said decoding means.

Preferably, the data register reads the data from an updated address on said memory immediately after an address stored in said data pointer register is updated.

Preferably, the data register terminates the function of reading the data from an updated address on said memory immediately after an address stored in said data pointer register is updated when continuously and repeatedly writing data in said internal memory.

Preferably, the plurality of general-purpose registers include a plurality of data registers and there are a plurality of data pointer registers corresponding to these plurality of data registers.

Preferably, the memory address space of said internal memory is divided into a plurality of banks and each of the plurality of data pointer registers stores only addresses in a corresponding bank among said plurality of banks.

The microprocessor of the first aspect of the present invention further comprises a switching means for switching interconnections among said data register, said plurality of general-purpose registers other than said data register, and said processing means.

Preferably, a mode of connection between said data register and said processing means and a mode of connection between said plurality of general-purpose registers other than said data register and said processing means are equivalent.

Further, the microprocessor of a second aspect of the present invention comprises: an instruction memory for storing a plurality of instructions; a program counter for designating an address on said instruction memory where an instruction to be next executed is stored; a decoding means for decoding instructions; an internal memory for storing data to be processed; a first data pointer register and a second data pointer register for storing addresses on said internal memory; a plurality of general-purpose registers including a first data register for storing data read from an address on said internal memory stored in said first data pointer register in accordance with a request for reading out data stored in said internal memory and a second data register for writing stored data at an address on said internal memory stored in said second data pointer register in accordance with a request for writing data to said internal memory; and a processing means for performing processing by using data stored in said general-purpose registers and for writing the result of processing in said general-purpose registers in accordance with the result of decoding of said decoding means and performing four-stage pipeline processing comprising, multiplexed, instruction fetching processing for reading an instruction from an address on said instruction memory designated by said program counter; decoding processing for decoding said fetched instruction and transfer data from said general-purpose registers to said processing means in accordance with need, processing by said processing means; and write back processing for writing the result of processing of said processing means in said general-purpose registers in accordance with need.

Preferably, the memory address space of said internal memory is divided into a plurality of banks, said first data pointer register and said second data pointer register access different banks of said internal memory, said decoding processing transfers data from said first data register to said processing means, and said write back processing transfers the results of said processing to said second data register.

Preferably, the first data pointer register and said second data pointer register automatically update an address stored in said first data pointer register and said second data pointer register in accordance with a predetermined pattern when there is a predetermined pattern in access to said internal memory.

Further, in the microprocessor of a second aspect of the present invention, processing for reading data from an address on said internal memory stored in said first data pointer register and storing it in said first data register and processing for writing the data written in said second data register at an address on said internal memory stored in said second data pointer register are performed in parallel with said four-stage pipeline processing.

Further, according to a microprocessor of a third aspect of the present invention, there is provided a microprocessor, comprising: an internal memory for storing data to be processed; a data pointer register for storing an address on said internal memory; a decoding means for decoding instructions; a data register for storing data read from an address on said internal memory stored in said data pointer register in accordance with a request for reading out data stored in said internal memory and for writing stored data at an address on said internal memory stored in said data pointer register in accordance with a request for writing data to said internal memory; a plurality of general-purpose registers; and a processing means for performing processing by using data stored in at least one of said data register and said general-purpose registers and writing the result of processing in said data register or said general-purpose registers based on the result of decoding of said decoding means.

Further, the processing method of the present invention comprises performing four-stage pipeline processing comprising, multiplexed, instruction fetching processing for reading an instruction from an address on an instruction memory designated by a program counter; decoding processing for decoding said fetched instruction; processing performed using data stored in a first data register based on the result of said decoding processing; and write back processing for writing the result of processing of said processing in a second data register and performing: processing for reading data from an address on an internal memory stored in a first data pointer register and storing it in said first data register and processing for writing back the data written in said second data register at an address on said internal memory stored in a second data pointer register in parallel with said four-stage pipeline processing.

BRIEF DESCRIPTION OF THE DRAWINGS

These and other objects and features of the present invention will become clearer from the following description of the preferred embodiments given with reference to the accompanying drawings, in which:

FIG. 6 is a view for explaining the format of a 2-operand processing instruction in the microprocessor shown in FIG. 1;

FIG. 7 is a view for explaining a processing instruction when a data register is designated as a source register in the processing instruction shown in FIG. 6;

FIG. 8 is a view for explaining a processing instruction when a data register is designated as a destination register in the processing instruction shown in FIG. 6;

FIG. 9 is a view for explaining a processing instruction when a data register is designated both as a source register and a destination register in the processing instruction shown in FIG. 6;

FIG. 11 is a view for explaining the format of a three-operand processing instruction used in the microprocessor shown in FIG. 1;

FIG. 12 is a view for explaining a program writing processing in the microprocessor shown in FIG. 1 similar to the program shown in FIG. 24 in the conventional microprocessor;

FIG. 13 is a view for explaining a program writing processing in the microprocessor shown in FIG. 1 similar to the program shown in FIG. 12 by designating data registers as both a source register and a destination address;

FIG. 14 is a view for explaining a program in the microprocessor shown in FIG. 1 showing processing of data stored at consecutive memory addresses on the internal memory;

FIG. 15 is a view for explaining a program in the microprocessor shown in FIG. 1 establishing three systems of paths for memory access and designating data registers in all of the three operands of an addition instruction;

FIG. 17 is a view for explaining an example in a case of designating a data register as a destination address in a two-operand processing instruction;

FIG. 18 is a view for explaining a program in the microprocessor according to the second embodiment of the present invention for processing data stored at consecutive memory addresses on the internal memory;

FIGS. 19A–19D is a view for explaining a case of executing the program shown in FIG. 18 by the four-stage pipeline processing shown in FIG. 4;

FIG. 21 is a view for explaining an ALU processing instruction having three register designators in a conventional microprocessor;

FIG. 22 is a view for explaining an instruction for processing data on the memory in a conventional microprocessor;

FIG. 24 is a view for explaining a program in the five-stage pipeline processing shown in FIG. 23 for ALU processing of the data in the memory; and FIG. 25 is a view for explaining a program in a conventional microprocessor for processing for repeatedly accessing addresses a predetermined distance apart in the memory address space.

DESCRIPTION OF THE PREFERRED EMBODIMENTS

Below, an explanation will be made of a microprocessors according to embodiments of the present invention.

First Embodiment

Figure 1:
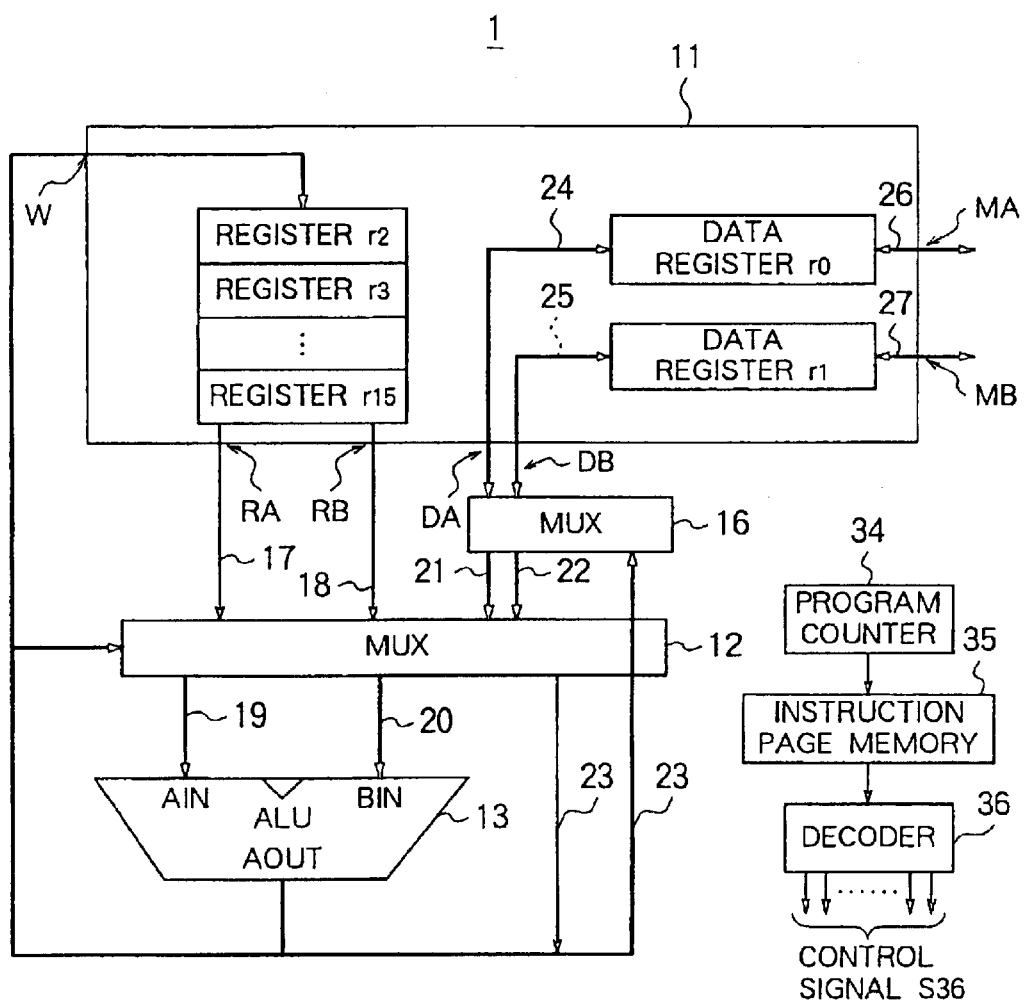
FIG. 1 is a block diagram of the configuration of a microprocessor according to a first embodiment of the present invention.

FIG. 1 is a view of the configuration of the microprocessor 1 of a first embodiment.

Figure 2:
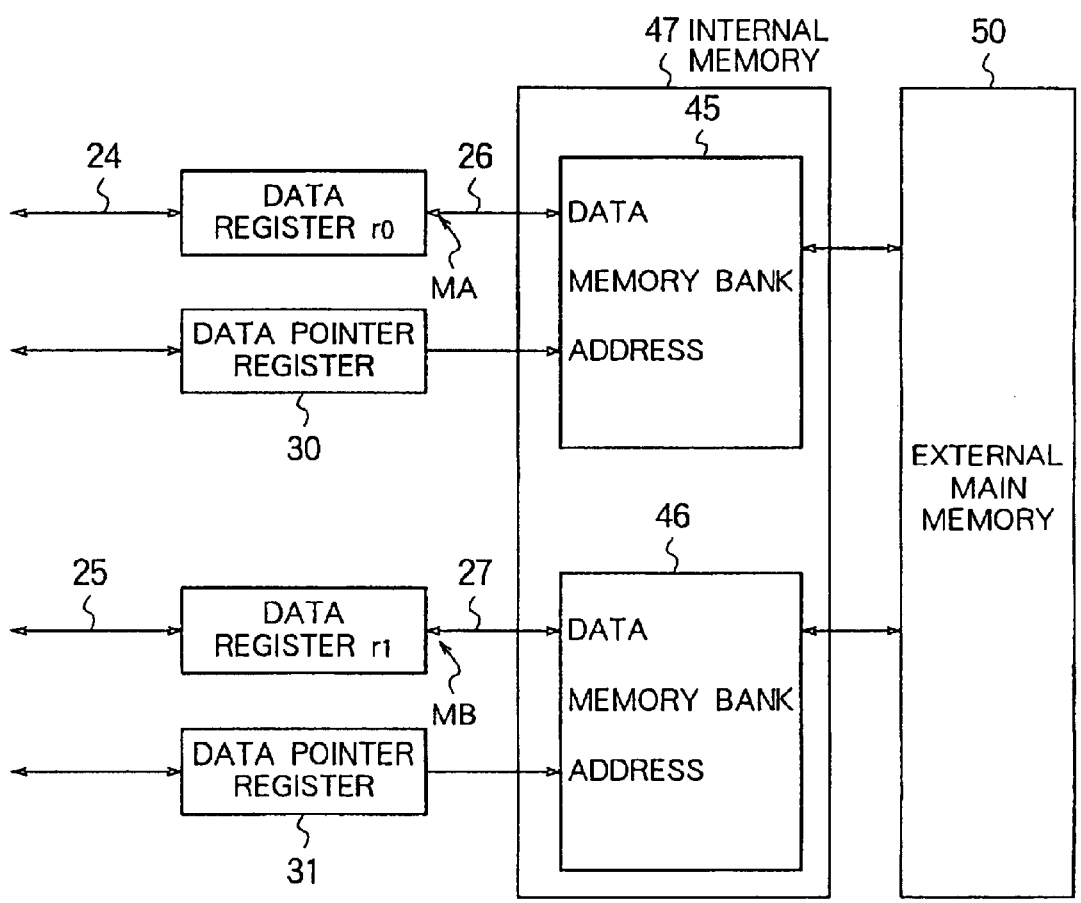
FIG. 2 is an explanatory view of a data register, a DP register, and an internal memory of a microprocessor shown in FIG. 1.

The microprocessor 1 comprises a general-purpose register module 11, multiplexers 12 and 16, an arithmetic and logic unit (ALU) 13, an instruction page memory 35, a decoder 36, shown in FIG. 1, and DP registers 30 and 31 and an internal memory 47, shown in FIG. 2, and is configured with these included in one chip.

Note that in the microprocessor 1, the processing explained below is performed based on a control signal S36 in response to a result of decoding of the decoder 36.

The general-purpose register module 11 is a set of registers comprising, for example, the 32-bit registers r0 to r15 used for general purposes.

The number of registers constituting the general-purpose register module 11 depends largely on the set of instructions or the chip architecture. Generally, it is set in the range of 8 to 32.

The general-purpose register module 11 is provided with seven ports W, RA, RB, MA, MB, DA, and DB as shown in FIG. 1. Here, the port W is a write port. The data output from the port AOUT of the ALU 13 is written in the general-purpose register module 11 via a bus 23 and the port W.

As shown in FIG. 2, the ports MA and MB are ports between memory banks 45 and 46, respectively, in the internal memory 47. Data are transmitted between the ports of the memory banks 45 and 46 via buses 26 and 27, respectively.

Note that this may also be configured without providing the ports MA and MB by switching the ports RA, RB, and W outside the general-purpose register module 11 to realize the connection between the memory banks 45 and 46.

Further, the ports RA and RB are read ports. The data read from the general-purpose register module 11 is output to the multiplexer 12 through the ports RA and RB and the buses 17 and 18, respectively.

Furthermore, the ports DA and DB are ports for two-way communication between the multiplexer 16 and the data registers r0 and r1, respectively.

In the general-purpose register module 11, the ports W, RA, RB, MA, MB, DA, and DB can be used simultaneously. Namely, a read operation and a write operation can be independently carried out on the general-purpose register module 11.

The microprocessor 1 uses the data registers r0 and r1 as buffers which serve as interfaces for communication with the memory via the buses 26 and 27. The registers r2 to r15 are used as ordinary general-purpose registers.

In the microprocessor 1, for example, when the ALU 13 uses data stored in the internal memory 47, it reads out the data to the data register r0 via the bus 26, then accesses the data register r0. At this time, it is also possible to read data from the internal memory 47 through the bus 27 into the data register r1, and then access the data register r1.

Further, when writing data to the internal memory 47, the microprocessor 1 writes the data to the data register r0 or r1, then transfers the written data to the internal memory 47 via the bus 26 or 27.

Note that the data registers r0 and r1 have substantially the same connection formats as the other registers r2 to r15 and can be used as general-purpose registers in the same way as the other registers r2 to r15.

Specifically, for example, when the multiplexer 16 selects connection between the buses 21 and 22 with the ports DA and DB, the ports DA and DB function in the same way as the ports RA and RB respectively and the buses 21 and 22 function in the same way as the buses 17 and 18, respectively. Further, when the multiplexer 16 selects connection between the bus 23 and the port DA or DB, the port DA or DB functions in the same way as the port W.

Accordingly, the data registers r0 and r1 are written uniformly as part of a group of general-purpose registers including the registers r2 to r15 in the program and recognized as the same in the decoder 36 as well.

The data pointer (DP) registers 30 and 31 store addresses in the memory address spaces of the memory banks 45 and 46 of the internal memory 47, specifically.

Note that the DP registers 30 and 31 are different from the registers r0 to r15 in the general-purpose register module 11. Part of the plurality of control registers is assigned for them. Therefore, the DP registers 30 and 31 cannot be designated directly using register designators of the ALU processing instruction and are designated by data transfer instructions.

Note that one instruction's worth of steps are required to write an address on the internal memory 47 to the DP registers 30 and 31, however, the access operation to the internal memory 47 via the data registers r0 and r1 is not written in the program but is carried out in the background separate from the processing directly indicated in the program.

Namely, the access operation to the internal memory 47 is carried out in parallel with the pipeline processing.

In the microprocessor 1, for example, at the time of reading the data stored in the memory bank 45 in the internal memory 47 shown in FIG. 2, the address in the memory bank 45 of the data to be read is written in the DP register 30. As a result, the data stored at the address in the memory bank 45 which is written in the DP register 30 is read automatically from the memory bank 45 to the data register r0 via the bus 26 by hardware. Then, the data is transferred from the data register r0 to the port AIN or BIN of the ALU 13 via the multiplexer 16.

Further, in the same way, when the microprocessor 1, for example, reads the data stored in the memory bank 46 in the internal memory 47 shown in FIG. 2, it writes the address of the data to be read in the memory bank 46 in the register 31. As a result, the data stored at the address in the memory bank 46 which is written in the DP register 31 is read automatically through the bus 27 from the memory bank 46 to the data register r1 by hardware. Then, the data is transferred from the data register r1 via the multiplexer 16 to the port AIN or BIN of the ALU 13.

As explained above, by writing addresses in the memory banks 45 and 46 to the DP registers 30 and 31, the microprocessor 1 automatically reads the data stored at the corresponding addresses to the data registers r0 and r1, respectively.

On the other hand, when writing data to predetermined addresses in the memory banks 45 and 46 of the internal memory 47, the microprocessor writes the corresponding addresses to the DP registers 30 and 31, then writes the corresponding data to the data registers r0 and r1, respectively. After this, the data stored in the data registers r0 and r1 are written automatically at the addresses in the memory banks 45 and 46 stored on the DP registers 30 and 31 by hardware.

Note that the data transfer between the data register r0 and the memory bank 45 and the data transfer between the data register r1 and the memory bank 46 can be carried out in the same pipeline cycle in the microprocessor 1.

When using one of the data registers r0 or r1 in a memory read operation to the internal memory 47, however, sometimes some cycles are wasted. This is because automatic read operations of data end up being unnecessarily performed for the data register r0 or r1.

To prevent this, it is possible to set at least one of the data registers r0 or r1 to an exclusive write operation mode in accordance with the objective of use so as to avoid execution of useless memory read (load) operations. One of the characteristics of the memory read and memory write operations is that, in the field of video processing etc., there is a high possibility of consecutive memory addresses being referenced. In other words, a memory read instruction is often followed by execution of another memory read instruction. Furthermore, there is a high possibility that consecutive memory addresses will be accessed at this time.

Accordingly, the DP registers 30 and 31 are for example provided with the function of automatically incrementing the stored addresses by, for example, +1, −1, +4, −4, +8, or −8 for every access to the data stored in the internal memory 47 so as to improve the processing efficiency when performing video processing.

The memory banks 45 and 46 in the internal memory 47 shown in FIG. 2 respectively store copies of the data having consecutive addresses in the memory address space of the external main memory 50.

It is not necessary that the addresses in the memory address space of the external main memory 50 be consecutive between the memory banks 45 and 46.

The ALU 13 is provided with the input ports AIN and BIN and the port AOUT. It executes arithmetic operations or logic operations on the data input from the input ports AIN and BIN based on the control signal S36 from the decoder 36 and outputs the data of the results of the processing from the port AOUT to the bus 23. The ALU 13 executes processing in one clock cycles. Here, depending on the type of the processing instruction, based on the control signal S36 from the decoder 36, the ALU 13 does not process the data input from the input port AIN or BIN, but outputs it from the output port AOUT as it is.

Below, an explanation will be given of the pipeline processing operation in the microprocessor 1.

The microprocessor 1, due to the configuration shown in FIG. 1, structures the data paths at the time of executing instructions as a 4-stage pipeline as described below.

Figure 4:
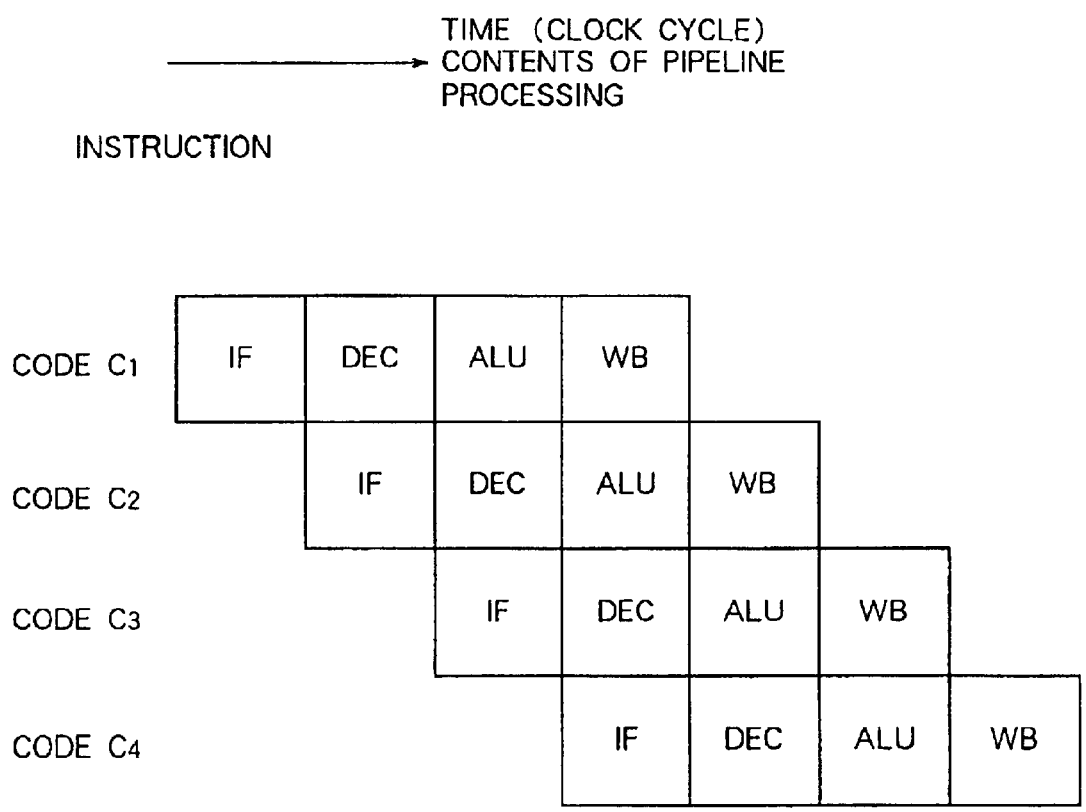
FIG. 4 is a view for explaining the four-stage pipeline processing of the microprocessor shown in FIG. 1.

FIG. 4 is a view for explaining the pipeline processing of the microprocessor 1.

As shown in FIG. 4, the microprocessor 1 applies four-stage pipeline consisting of the IF stage, DEC stage, ALU stage, and WB stage.

Figure 23:
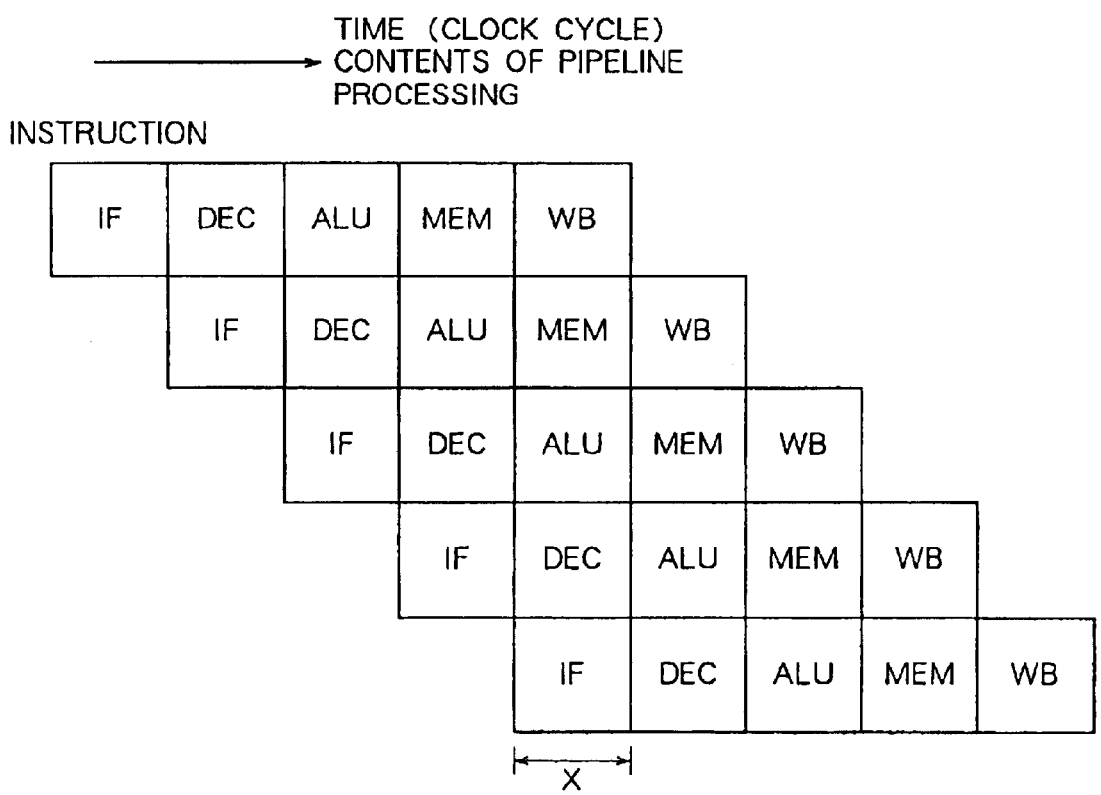
FIG. 23 is a view for explaining the five-stage pipeline processing of a conventional microprocessor.

That is, the four-stage pipeline shown in FIG. 4 does not have the MEM stage of the five-stage pipeline shown in FIG. 23.

In the four-stage pipeline shown in FIG. 4, the processings of the IF stage, DEC stage, and ALU stage are the same as those in the case of the five-stage pipeline of the above-mentioned FIG. 23.

In the four-stage pipeline shown in FIG. 4, the IF stage, DEC stage, ALU stage, and WB stage are performed multiplexed.

Specifically, the microprocessor 1 fetches (reads) the instruction to be executed next from the address on the instruction memory 35 indicated by the program counter 34 shown in FIG. 1 at the first IF stage.

Next, it decodes the instruction fetched at the IF stage by the decoder 36 shown in FIG. 1 at the second DEC stage. Then, the multiplexers 12 and 16, ALU 13, and so forth are controlled based on a control signal S36 in accordance with the results of the decoding.

Note that if the instruction designates the registers r0 to r15 in the general-purpose register module 11 as source registers, the microprocessor reads the data from the data registers r0 to r15 via the multiplexer 12 to the ports AIN and BIN of the ALU 13 after decoding the instruction in the DEC stage. That is, the microprocessor 1 can access the data registers r0 and r1 in the same way as the other general-purpose registers r2 to r15 in accordance with the program.

At this time, if it is necessary to access the internal memory 47, the microprocessor stores the predetermined address on the internal memory 47 to the DP registers 30 and 31 shown in FIG. 2, then accesses the data registers r0 and r1 to realize access to the internal memory 47.

Next, the microprocessor executes the ALU processing instruction at the third ALU stage. Note that if the fetched instruction is not an ALU processing instruction, nothing is performed at the ALU stage and the data input from the ports AIN and BIN is output from the port AOUT of the ALU 13 as it is.

Next, in the fourth WB stage, the result of the processing of the ALU 13 is written back to a designated register for an instruction designating one of the data registers r0 and r1 and registers r2 to r15 as a destination register. At the time, by writing data in the data registers r0 and r1, data is indirectly written back to the internal memory 47 via the buses 26 and 27.

Figure 5:
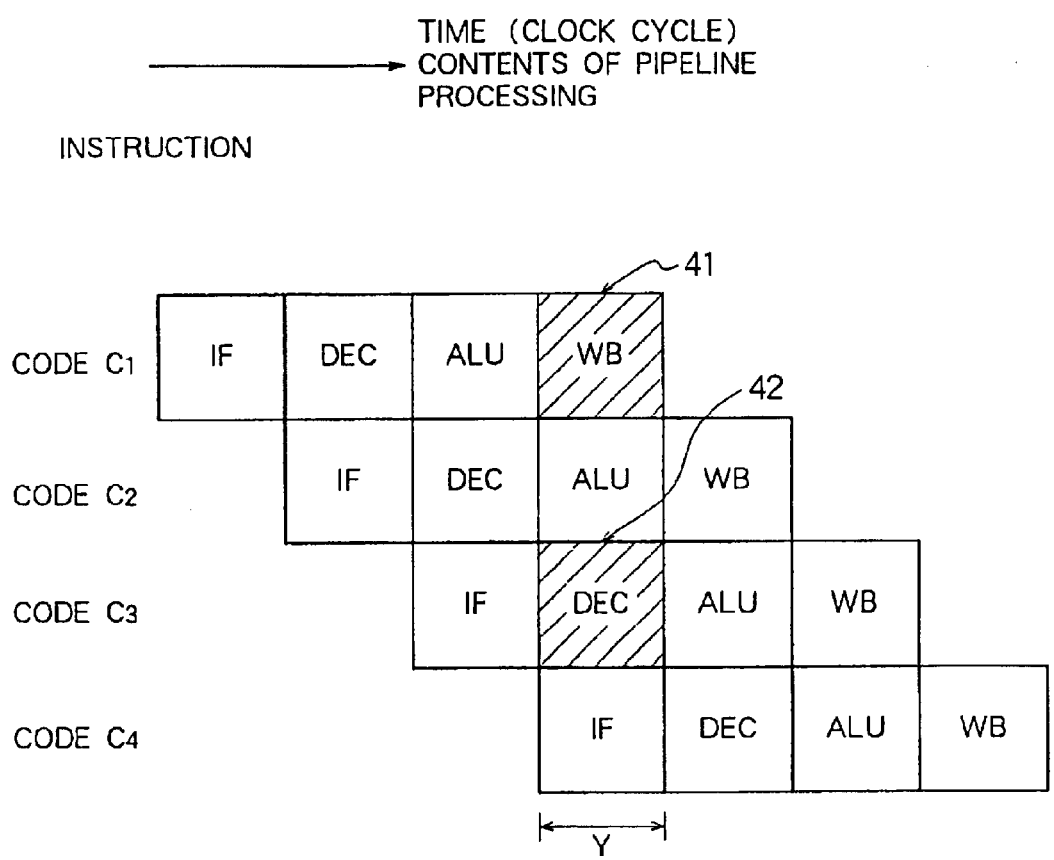
FIG. 5 is a view for explaining the pipeline processing of the microprocessor shown in FIG. 1.

In the four-stage pipeline processing shown in FIG. 4, when the code C1 is an instruction accompanied with a memory write operation with respect to the internal memory 47 shown in FIG. 2 and the code C3 is an instruction accompanied with a memory read operation with respect to the internal memory 47, simultaneously memory accesses are performed at the WB stage 41 of the code C1 and the DEC stage 42 of the code C3 in the clock cycle Y shown in FIG. 5.

In this case, since the micro-processor 1 is provided with the data registers r0 and r1 which serve as buffers for accessing to the internal memory 47 and are provided with two systems of access paths to the internal memory 47, if the banks of the internal memory 47 to be accessed by the code C1 and C3 are different, as shown in FIG. 5, the WB stage 41 of the code C1 and the DEC stage 42 of the code C3 can be multiplexed and the pipeline processing will not be disturbed (will not stall).

Below, an example of an access operation to the internal memory 47 in accordance with the description of a program in the microprocessor 1 will be explained.

When Using Two-Operand Processing Instruction

Below, as shown in FIG. 6, an explanation will be made of an access operation to the internal memory 47 in the case of writing a program using a two-operand processing instruction provided with two operands designating an operation code (OP) and a [source register] and [destination register].

For example, as shown in FIG. 7, when designating the data register r0 as a source register in a two-operand processing instruction, data is read from an address stored in the DP register 30 on the internal memory 47 to the data register r0, then the data stored in the data register r0 and the data stored the register r4 are added and the result of the addition is written in the register r4.

Also, for example, as shown in FIG. 8, when the data register r1 is designated as a destination register in a two-operand processing instruction, the data is read from an address stored in the DP register 31 on the internal memory 47 to the data register r1, then the data stored in the data register r1 and the data stored in the register r4 are added and the result of the addition is written to the data register r1. After this, the data stored in the data register r1 is written at an address stored in the DP register 31 in the internal memory 47.

Further, for example, as shown in FIG. 9, when the data register r0 is designated as a source register and the data register r1 is designated as a destination register in a two-operand processing instruction, the data is read from addresses in the internal memory 47 stored in the DP registers 30 and 31 to the data registers r0 and r1, then the data stored in the data register r0 and the data stored in the data register r5 are added and the result of the addition is written in the register r1. Then, the data stored in the data register r1 is written at the address in the internal memory 47 stored in the DP register. 31.

Figure 10:
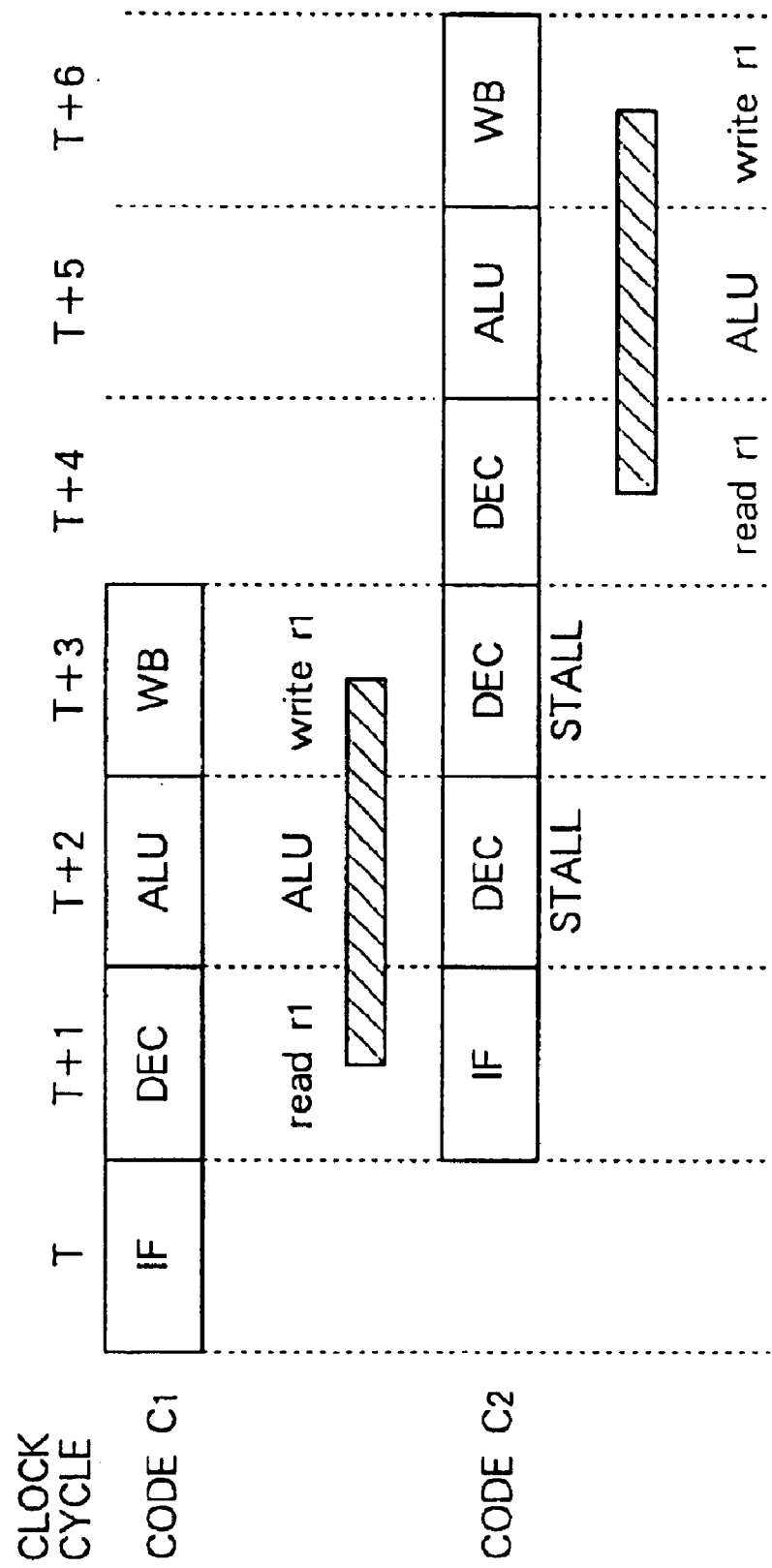
FIG. 10 is a view for explaining a stall in pipeline processing which occurs when consecutively performing the processing instruction shown in FIG. 8.

When consecutively executing the processing instruction shown in FIG. 8, a two clock cycle pipeline hazard (stalling) occurs, as shown in FIG. 10, in the pipeline processing in the microprocessor 1 shown in FIG. 4.

This is because the write operation and the read operation with respect to the data register r1 compete at the clock cycle T+3 shown in FIG. 10.

That is, when the processing instruction code C1 shown in FIG. 8 proceeds to the DEC stage at the clock cycle T+1, the decoder 36 shown in FIG. 1 recognizes that the code C1 is a load/store instruction and locks it within the register r1. Next, when the code C1 proceeds to the WB stage at the clock cycle T+3, the lock is released. Namely, the read-modify-write operation to the internal memory 47 is locked until the write back operation. Even if an instruction tries to access the locked register, the access is delayed until the lock is released. Then, the output of the ALU 13 is written in the data register r1 at the clock cycle T+3, a decision is made to release the lock, and the DP register 31 is updated. At the clock cycle T+4, the data is read from the internal memory 47 to the data register r1 in response to the code C2, then the same processing as the case of the code C1 is repeated.

Case of Using Three-Operand Processing Instructions

Below, as shown in FIG. 11, an explanation will be made of an access operation to the internal memory 47 in the case of writing a program using a three-operand processing instruction having three operands designating an operation code (OP) and a [source register] and [destination register].

In the microprocessor 1, for example, when executing the program shown in FIG. 24 for the conventional microprocessor, the program can be written as shown in FIG. 12.

In FIG. 12, the instruction "mov r0, r2" indicates to transfer data on the internal memory 47 stored in the data register r0 to the register r2.

At this time, before executing this instruction "mov r0, r1", the address of the data to be read in the memory bank 45 is stored in the DP register shown in FIG. 2. The data stored in the corresponding address is transferred to the data register r0 via the bus 26 by hardware.

Then the data in the internal memory 47 stored in the data register r0 is transferred to the register r2 via the bus 24, multiplexers 16 and 12, and bus 23.

The instruction "add r2, r9, r3" indicates to add the data stored in the register r2 and the data stored in the register r9 and store the result to the register r3.

By this, the data stored in the register r2 is output to the port AIN of the ALU 13, the data stored in the register r9 is output to the port BIN, and the ALU 13 adds the same. The result of the addition is written from the port AOU through the bus 23 in the register r3 in the general-purpose register module 11.

The instruction "mov r3, r1" indicates to transfer the data stored in the register r3 to the data register r1.

By this, the data stored in the register r3 is transferred to the register r1 through for example the bus 17, multiplexer 12, bus 23, multiplexer 16, and bus 25. After this, the data stored in the data register r1 is automatically written by the hardware via the bus 27 to the address in the internal memory 47 stored in the DP register 31.

In this way, in the microprocessor 1, instead of the load instruction "1w" and store instruction "sw" shown in FIG. 25, a program in which the inter-register transfer instruction "mov" is written as shown in FIG. 12 is executed.

Note that the program shown in FIG. 12 can be written, for example, as shown in FIG. 13. In the program shown in FIG. 13, the data registers r0 and r9 are designated as the source registers of the instruction "add", and the data register r1 is designated as a destination address.

In this case, however, it is necessary that the addresses in different banks in the internal memory 47 be designated by the DP registers 30 and 31.

The program shown in FIG. 13 is executed by the microprocessor 1 in one clock cycle.

Further, in the microprocessor 1, when processing data stored at consecutive memory addresses in the internal memory 47, for example, the program is written as shown in FIG. 14.

When executing the program shown in FIG. 14, the addresses stored in the DP registers 30 and 31 shown in FIG. 2 are successively updated by for example adding "+4" so as to successively access the addresses at "+4" intervals in the internal memory 47 via the data registers r0 and r1.

In FIG. 13, the instruction "add r0, r9, r1" indicates to add the data stored in the data register r0 and the data stored in the register r9 and store the result of the addition in the data register r1.

In the processing according to the program shown in FIG. 14, the eight pieces of data in the internal memory 47 are processed. Note that the program shown in FIG. 14 can be written by using a loop.

Figure 3:
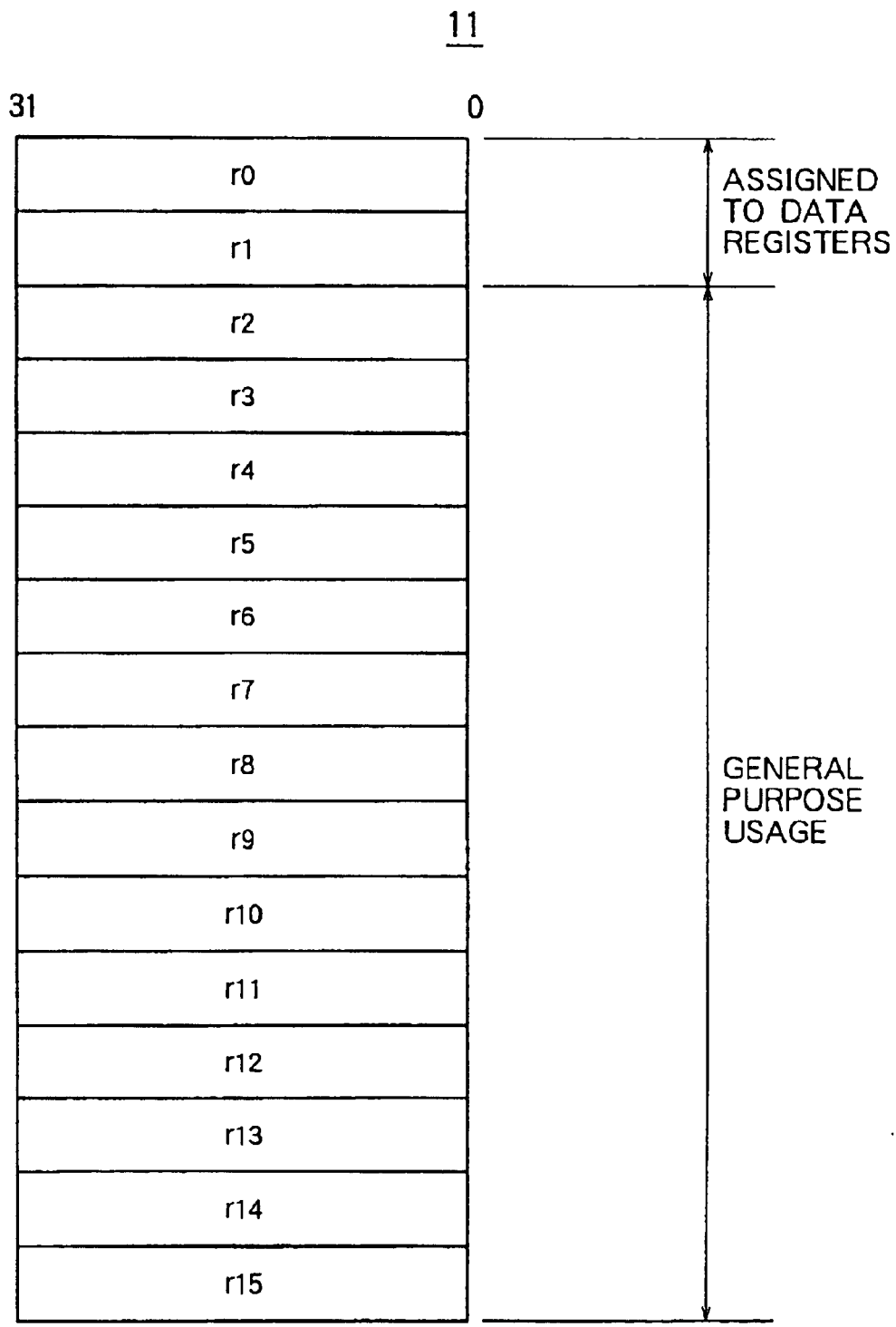
FIG. 3 is an explanatory view of the configuration of a general-purpose register in FIG. 1.

In the microprocessor 1, for example, by treating the register r14 in the general-purpose register module 11 shown in FIG. 3 as a data register and further providing a DP register corresponding to the register r14, it is possible to establish three systems of paths for the memory access. In this case, by writing a program as shown in FIG. 15, it is possible to designate the data registers r0, r14, and r1 in all of the three operands of the addition instruction "add".

As explained above, according to the microprocessor 1, by using part of the plurality of general-purpose registers constituting the general-purpose register module 11 as data registers r0 and r1, it is not necessary to separately write a memory load instruction and memory write instruction for memory access to the internal memory 47 in the program. That is, a set of instructions can be written uniformly as processing to be performed between data stored in the general-purpose registers including the cases which require memory access.

Namely, according to the microprocessor 1, the access to the internal memory 47 is treated as an extension of the access to the general-purpose registers, and the data registers r0 and r1 can be used as memory windows by software.

Furthermore, in the microprocessor 1, when the addresses in the internal memory 47 to be accessed and the order of accessing are predetermined, by using the address updating function of the DP registers 30 and 31 to automatically update the addresses stored in the DP registers 30 and 31, it is not necessary to write the procedure for the memory access in the program clearly every time.

Accordingly, when processing a plurality of data stored at consecutive addresses in the memory address space of the internal memory address 47 by accessing it in order, it is not necessary to designate the address of data to be accessed every time. It is sufficient to write only the ALU processing instruction in the program.

At this time, by reading the data from the internal memory 47 immediately after the automatic updating of the DP registers 30 and 31 to the data registers r0 and r1, it is possible to avoid a delay in the ALU 13 completing the memory access each time an ALU processing instruction is executed. Namely, at the time the ALU 13 executes ALU processing in accordance with the program, it is possible to set a state where data is already read from the internal memory 47 to the data registers r0 and r1.

As a result, in the processing in the microprocessor 1, it is possible to effectively realize multiplexing of instructions and, for example, to execute the ALU processing instructions at every clock cycle in pipeline processing. Also, it is possible to simplify the writing of a program by users.

Also, according to the microprocessor 1, by providing two DP registers 30 and 31 and executing the ALU processing instructions directly on the data in the internal memory 47, for example, it is possible to write the processing for reading and processing the data on the internal memory 47, then write it back to the internal memory 47 in one instruction. In addition, when the bank of the data to be read from the internal memory 47 and the bank of the data to be written in the internal memory 47 are different in an instruction, it is possible to execute the instruction within one clock cycle. Note that when both of the DP registers 30 and 31 are capable of designating all of the addresses in the internal memory 47, if the address of data to be read from the internal memory 47 and the address of the data to be written in the internal memory 47 are different, the instruction can be executed within one clock cycle.

For example, in a program, it is possible to write processing accompanied with memory access in one instruction, for example, as shown in FIG. 13, and to execute it within one clock cycle.

In the microprocessor 1, when consecutively executing an instruction to write back data to the internal memory 47 (data transfer instruction designating the data register r0 or r1 as a destination register), it is possible to stop the automatic read function of the DP registers 30 and 31 to eliminate the wasteful memory read operations. As a result, it is possible to consecutively execute memory write operations and realize multiplexing of instructions.

Also, in the microprocessor 1, by providing a memory configuration using the data registers r0 and r1 and the DP registers 30 and 31, the MEM stage in the conventional five-stage pipeline processing shown in FIG. 23 becomes unnecessary and the four-stage pipeline configuration as shown in FIG. 4 can be applied.

Namely, since the read operation to the internal memory 47 is carried out using the data registers r0 and r1, the write operation to the internal memory 47 can be performed by the register write operation performed at the WB stage. Therefore, it is not necessary to separately provide the stage for memory access processing in the pipeline processing.

As a result, in the microprocessor 1, the control circuit of the processor as a whole can be simplified, and it is possible to flexibly deal with exceptional processing including external interruption processing.

Second Embodiment

The microprocessor of the present embodiment has basically the same configuration as the microprocessor 1 of the above-mentioned microprocessor 1 except for the number of the banks in the internal memory, the numbers of data registers and DP registers, and the provision of a multiplexer 82 in place of the multiplexers 12 and 16 shown in FIG. 1.

Figure 16:
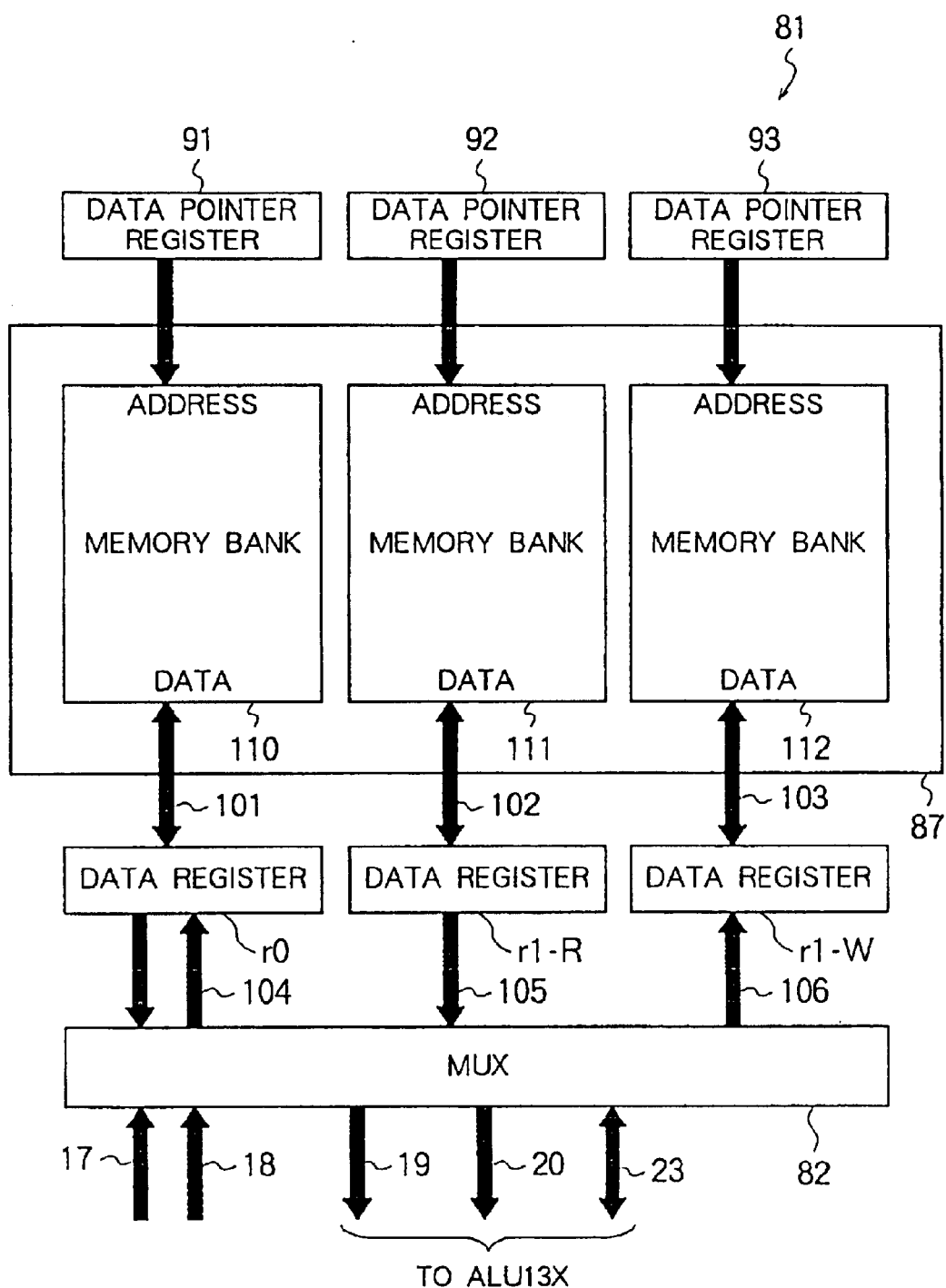
FIG. 16 is a view of the configuration around the internal memory 87 of a microprocessor according to a second embodiment of the present invention.
Figure 20:
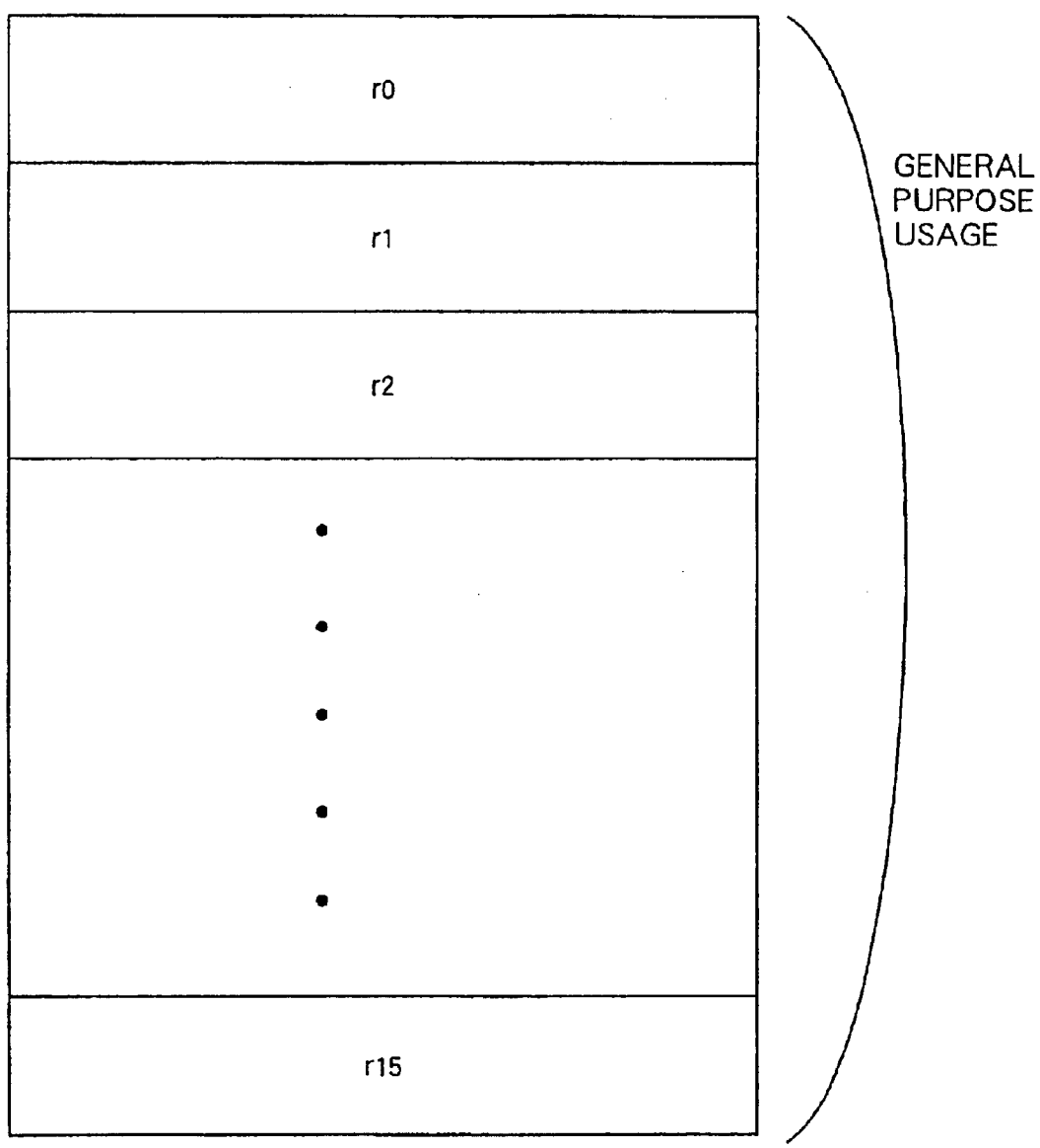
FIG. 20 is a view for explaining conventional general-purpose registers of RISC type and CISC type microprocessors.

FIG. 16 is a view of the configuration around the internal memory 87 of the microprocessor 81 of the present embodiment.

As shown in FIG. 16, the microprocessor 81 comprises an internal memory 87, DP registers 91, 92, and 93, data registers r0, r1-R, and r1-W, a multiplexer 82, and buses 101 to 106.

Further, the microprocessor 81, in the same way as the microprocessor 1 shown in FIG. 1, comprises the ALU 13, program counter 34, instruction page memory 35, decoder 36, and buses 17, 18, 19, 20, and 23.

The microprocessor 81 uses the register r1 shown in FIG. 1 as the register r1-R and uses the register r2 as the register r1-W. Namely, the microprocessor 81 comprises the registers r2 to r15 in addition to the registers r0, r1-R, and r1-W.

Note that in the microprocessor 81, the physical data register r1-R and data register r1-W are treated as one data register r1 logically in writing a program.

The microprocessor 81 reads data from an address in the memory bank 110 in the internal memory 47 stored in the DP register and stores it in the data register r0.

The data register r1-R is exclusively for read operations of the data from the memory bank 111 of the internal memory 87. When the address of the logical data register r1 serving as a destination register is designated in the two-operand processing instruction written in the program, it stores the data read from the address in the memory bank 111 stored in the DP register 92.

Further, the data register r1-W is exclusively for write operations of data to the memory bank 112 of the internal memory 87. When an address of the logical data register r1 serving as a destination register is designated in the two-operand processing instruction written in the program, it writes the data stored in the data register r1-W to the address in the memory bank 112 stored in the DP register 93.

Note that the address of the logical data register r1 can be indirectly designated, for example, by a logical address via a logical register name, other than being designated directly by a logical address.

Below, the operation of the microprocessor 81 will be explained.

The microprocessor 81 executes a two-operand processing instruction having, for example, the format shown in FIG. 6.

When the microprocessor 81, for example, as shown in FIG. 17, executes an instruction which designates the data register r1 as a destination address, it first writes to the DP register 92 the address in the memory bank 111 at which the data to be added is stored, then reads data to be added to the data register r1-R via the bus 102. Next, the ALU 13 shown in FIG. 1 performs the processing for adding the data stored in the register r5 and the data stored in the data register r1-W via the bus 106. Further, it writes in the DP register 93 the address in the memory bank 112 to which the data of the result of the addition is written back.

By this processing, the data of the result of addition stored in the data register r1-W is written back to the memory bank 112 via the bus 103 by hardware.

Below, an explanation will be made of the case of the microprocessor 81 processing data stored at consecutive memory addresses in the internal memory 87.

When the microprocessor 81, for example, executes the program shown in FIG. 18 by the four-stage pipeline processing shown in FIG. 4, the processing becomes as shown in FIG. 19(A).

For each of the codes C1 to C6 shown in FIG. 18, in the pipeline processing shown in FIG. 19(A), the instruction "add r0, r1" is fetched at the IF stage, one of the data to be added which is read from the address on the memory bank 110 stored in the DP register 91 to the data register r0 is output from the data register r0 to the port AIN of the ALU 13 at the DEC stage. At the same time, the other data to be added which is read from the address on the memory bank 111 stored in the DP register 92 to the data register r1-R is output from the data register r1-R to the port BIN of the ALU 13. Next, addition is performed using the two data to be added in the ALU 13 at the ALU stage, and the result of addition by the ALU 13 is written from the port AOUT in the data register r1-W. Then, the data stored in the data register r1-W is written back to the address on the memory bank 112 stored in the DP register 93.

At this time, as shown in FIG. 19(A), the IF stage of the code C1 is performed at the clock cycle T. Further, as shown in FIG. 19(B), the memory read operations (decode stage) to the data register r0 by the codes C1 to C6 are carried out in turn at the clock cycles T+1 to T+6. Also, as shown in FIG. 19(c), the memory read operations (decode stage) to the data register r1-R by the codes C1 to C6 are carried out in turn at the clock cycles T+1 to T+6. Furthermore, as shown in FIG. 19(D), the memory write operations (WB stage) to the data register r1-W by the codes C1 to C6 are carried out in turn at the clock cycles T+3 to T+8.

Namely, the microprocessor 81, as explained above, by providing the data registers r1-R and r1-W, it is possible to perform the memory read operation and the memory write operation to the data register r1 simultaneously. As a result, the codes C1 to C6 as shown in FIG. 18 can be executed in one clock cycle.

As explained above, according to the microprocessor 81, even when repeatedly and consecutively executing a two-operand processing instruction which designates the logical data register 1 as a destination address and performs a read-modify-write operation, it is possible to execute each of the processing instructions within one clock cycle.

Also, according to the microprocessor 81, it is possible to access three different three bits of data in the internal memory 87 in the same clock cycle using a two-operand processing instruction and to real processing substantially similar to three-operand processing.

The present invention is not limited to the above embodiments.

For example, in the above embodiments, the example was given of the case of using two general-purpose registers as the data registers r0 and r1 in the general-purpose register module 11, but any number of registers can be used so long as it is one or more.

Furthermore, for the method of use of the data registers r0 and r1, other than use as an interface with the internal memory 47, for example, they can be used as first-in-first-out (FIFO) memories for communication between microprocessors in a parallel processing processor having a plurality of microprocessors. Furthermore, the data registers r0 and r1 can be used as local memories or stack memories.

In the microprocessor 1, as shown in FIG. 1, the multiplexer 12 and 16 are provided independently, however, the function of the multiplexer 16 can be included in the multiplexer 12.

Also, in the microprocessor 1, as shown in FIG. 2, the internal memory was configured separated into two banks, however, the internal memory may also be configured separated into three or more banks or configured without being separated into banks.

Also, in the microprocessor 1, as shown in FIG. 1, the data registers r0 and r1 are provided as part of the plurality of the general-purpose registers in the general-purpose register module 11, however, the data registers r0 and r1 can be provided outside the external of the general-purpose register module 11 and treated as separate from the general-purpose registers.

Further, in the microprocessor 81 having the memory configuration shown in FIG. 16, it is also possible to provide three FIFO memories instead of the internal memory 87, connecting the input use FIFO memory to the data register r1-R, and connecting the output use FIFO memory to the data register r1-R.

As explained above, according to the microprocessor of the present invention, by realizing access to the internal memory by using data registers, it is possible to treat access to the internal memory in the same way as access to the registers. As a result, the burden at the time users write a program can be lightened.

Also, according to the microprocessor of the present invention, by using the general-purpose registers as data pointer registers, it is possible to treat access to the internal memory in the same way as access to the general-purpose registers.

Also, according to the microprocessor of the present invention, since the write operation to the internal memory is performed using the second data register, it is possible to perform the write operation to the internal memory by a register write operation performed in the write back operation. As a result, there is no need to separately provide a memory access stage in the pipeline processing and it is possible to perform four-stage pipeline processing. As a result, effective processing can be realized by a simple hardware configuration.

Also, according to the processing method of the present invention, it is possible to realize effective processing by four-stage pipeline for similar reasons.

Furthermore, according to the microprocessor and the method thereof of the present invention, the read operation and write operation of data between the first data register, second data register, and internal memory can be performed in parallel with the pipeline processing, thus the pipeline processing can be performed smoothly without stalling and a high processing capability can be brought out.

Note that the present invention is not limited to the above embodiments and includes modifications within the scope of the claims.

What is claimed is:

1. A microprocessor, comprising:
   an internal memory having a plurality of internal memory banks, an instruction memory, a plurality of general-purpose registers, an instruction fetch unit, a decoder, and an arithmetic logic unit,
   said plurality of internal memory banks storing operand data;
   said instruction memory storing a plurality of program instructions,
   said instruction fetch unit fetching a program instruction of said plurality of program instructions from said instruction memory;
   a first data register of said plurality of general-purpose registers for directly receiving said operand data from one of said internal memory banks;
   a second data register of said plurality of general-purpose registers for directly receiving presenting processed data to another one of said internal memory banks;
   a general-purpose register of said plurality of general-purpose registers receiving one of said operand data and said processed data;
   said decoder decoding said fetched program instruction and transferring said operand data from said general-purpose register to said arithmetic logic unit during a decoding cycle,
   said arithmetic logic unit producing said processed data by using said program instruction to perform at least one of an arithmetic operation and a logic operation,
   said processed data being transferred to said general-purpose register while simultaneously reading another program instruction of said plurality of program instructions from said instruction memory,
   wherein, said arithmetic logic unit produces and transfers said processed data within one clock cycle, said received operand data and received said processed data being transferable within said one clock cycle to an input of said arithmetic logic unit and to any of said plurality of general-purpose registers.

2. A microprocessor as set forth in claim 1, wherein said arithmetic logic unit uses said operand data to produce said processed data.

3. A microprocessor as set forth in claim 1, wherein said plurality of general-purpose registers is a plurality of data registers.

4. A microprocessor as set forth in claim 1, wherein said operand data are data to be processed by said arithmetic logic unit, and said processed data are data resulting from processing by said arithmetic logic unit.

5. A microprocessor as set forth in claim 1, wherein said at least one of an arithmetic operation and a logic operation is performed on said operand data.

6. A microprocessor as set forth in claim 1, further comprising:
   an internal memory, internal memory data being stored at an internal memory address of said internal memory.

7. A microprocessor as set forth in claim 6, wherein said processed data is written to said internal memory while said another program instruction is simultaneously fetched from said instruction memory.

8. A microprocessor as set forth in claim 7, wherein said at least one of an arithmetic operation and a logic operation is performed within one clock cycle.

9. A microprocessor as set forth in claim 6, wherein,
   a first memory bank of said plurality of internal memory banks storing said operand data,
   a second memory bank of said plurality of internal memory banks storing said processed data.

10. A microprocessor as set forth in claim 8, wherein said operand data is transferred to first data register of said plurality of general-purpose registers.

11. A microprocessor as set forth in claim 10, wherein said processed data is transferred to said second data register of said plurality of general-purpose registers.

12. A microprocessor as set forth in claim 6, wherein said operand data includes first operand data and second operand data,
   a first memory bank of said plurality of internal memory banks storing said first operand data,
   a second memory bank of said plurality of internal memory banks storing said second operand data.

13. A microprocessor as set forth in claim 12, wherein said first operand data is transferred to said first data register of said plurality of general-purpose registers.

14. A microprocessor as set forth in claim 12, wherein said second operand data is transferred to said second data register of said plurality of general-purpose registers.

15. A microprocessor as set forth in claim 6, further comprising:
   a plurality of data pointer registers, a data pointer register of said plurality of data pointer registers receiving said internal memory address.

16. A microprocessor as set forth in claim 15, wherein said plurality of genera-purpose registers includes an exclusive-read data register, said exclusive-read data register being a unidirectional register, said internal memory data being provided from said internal memory through said exclusive-read data register.

17. A microprocessor as set forth in claim 15, wherein said plurality of general-purpose registers includes an exclusive-write data register, said exclusive-write data register being a unidirectional register, said internal memory data being provided to said internal memory through said exclusive-write data register.

18. A microprocessor as set forth in claim 15, wherein said data pointer register increments said internal memory address.

19. A microprocessor as set forth in claim 15, wherein said data pointer register automatically increments said internal memory address.

20. A microprocessor as set forth in claim 15, wherein said internal memory includes at least one of said operand data and said processed data.

21. A microprocessor as set forth in claim 15, wherein said operand data is located within said internal memory at an internal memory address.

22. A microprocessor as set forth in claim 15, wherein said processed data is written to said internal memory.

23. A microprocessor as set forth in claim 1, wherein said at least one of an arithmetic operation and a logic operation is performed within one clock cycle.

24. A microprocessor as set forth in claim 23, wherein said operand data includes first operand data and second operand data, a program instruction format for said program instruction includes an operand designator, a destination designator and an operation code, said operation code identifying said at least one of an arithmetic operation and a logic operation to be performed by said arithmetic logic unit, said operand designator designates from where said first operand data are retrieved, said destination designator designating from where said second operand data are retrieved and to where said processed data are stored, said processed data resulting from said at least one of an arithmetic operation and a logic operation being performed on said first and second operand data, said destination designator designating to where said processed data are stored.

25. A microprocessor as set forth in claim 24, wherein:

said operand designator designates an operand data register of said plurality of general-purpose registers, said first operand data are retrieved from said operand data register, said destination designator designates a destination register of said plurality of general-purpose registers, said second operand data are retrieved from said destination register, and said processed data are store onto said destination register.

26. A microprocessor as set forth in claim 23, wherein said operand data includes first operand data, second operand data and third operand data, a program instruction format for said program instruction includes an operand designator, another operand designator, a destination designator and an operation code, said operation code identifying said at least one of an arithmetic operation and a logic operation to be performed by said arithmetic logic unit, said operand designator designates from where said first operand data are retrieved, said another operand designator designating from where said second operand data are retrieved, said processed data resulting from said at least one of an arithmetic operation and a logic operation being performed on said first and second operand data, said destination designator designating to where said processed data are stored.

27. A microprocessor as set forth in claim 26, wherein:

said operand designator designates an operand data register of said plurality of general-purpose registers, said first operand data being retrieved from said operand data register, said another operand designator designates another operand data register of said plurality of general-purpose registers, said second operand data being retrieved from said another operand data register, said destination designator designates a destination register of said plurality of general-purpose registers, said processed data being store onto said destination register.

* * * * *

UNITED STATES PATENT AND TRADEMARK OFFICE
CERTIFICATE OF CORRECTION

PATENT NO. : 6,725,355 B1
DATED : April 20, 2004
INVENTOR(S) : Yoshihiko Imamura It is certified that error appears in the above-identified patent and that said Letters Patent is hereby corrected as shown below:

<u>Column 18,</u>
Line 59, "genera-purpose" should read -- general-purpose --.

<u>Column 20,</u>
Lines 4 and 40, "store" should read -- stored --.

Signed and Sealed this

Fourteenth Day of September, 2004

JON W. DUDAS
*Director of the United States Patent and Trademark Office*